United States Patent [19]

Lane, Jr.

[11] Patent Number: 5,366,244
[45] Date of Patent: Nov. 22, 1994

[54] FLEXIBLE HEIGHT ADJUSTER FOR A VEHICLE SAFETY BELT

[75] Inventor: Wendell C. Lane, Jr., Romeo, Mich.

[73] Assignee: TRW Vehicle Safety System Inc., Lyndhurst, Ohio

[21] Appl. No.: 142,729

[22] Filed: Oct. 25, 1993

[51] Int. Cl.⁵ .............................................. B60R 22/20
[52] U.S. Cl. .................................. 280/801.2; 280/808
[58] Field of Search ................ 280/801 R, 801 A, 808

[56] References Cited

U.S. PATENT DOCUMENTS

| | | | |
|---|---|---|---|
| 3,521,901 | 8/1968 | Wackym | 280/801 A |
| 4,247,131 | 1/1981 | Fiehl | 280/801 A |
| 4,597,588 | 7/1986 | Kawai | 280/801 A |
| 4,702,494 | 10/1987 | Escaravage | 280/801 A |
| 5,066,043 | 11/1991 | Tokugawa | 280/801 A |

Primary Examiner—Kenneth R. Rice
Attorney, Agent, or Firm—Tarolli, Sundheim & Covell

[57] ABSTRACT

An adjustable vehicle safety belt guide assembly (10) includes a base (28) and a movable carriage (30). The base (28) is mountable on a vehicle pillar (12) and includes a flexible cable (38), anchors (34, 36), and a plurality of lugs (40). The anchors (34, 36) are connectable with the pillar (12), and the flexible cable (38) is connected to the anchors (34, 36). The flexible cable (38) can follow the contour of the pillar (12). The lugs (40) are fixed to the flexible cable (38) to define adjustment positions for the carriage (30). The carriage (30) is movable along the flexible cable (38) and includes a lock mechanism (74) for releasably engaging the lugs (40).

15 Claims, 4 Drawing Sheets

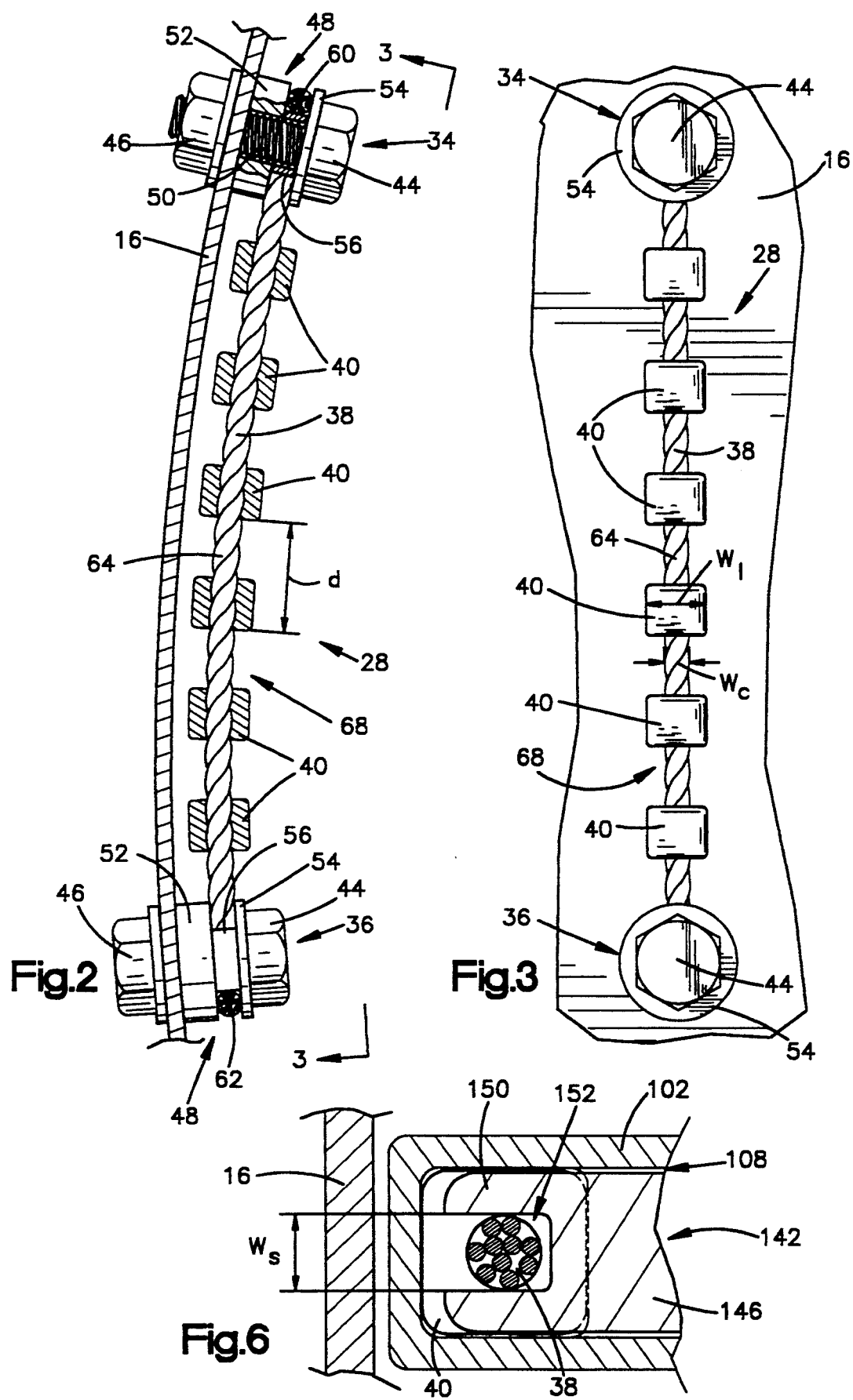

FLEXIBLE HEIGHT ADJUSTER FOR A VEHICLE SAFETY BELT

BACKGROUND OF THE INVENTION

The present invention relates to a height adjuster for a shoulder belt for an occupant of a vehicle.

A shoulder belt in a vehicle typically extends upward from a seat belt retractor mounted near the floor of the vehicle through a seat belt guide (D-ring). From the D-ring, which is mounted on the vehicle above and behind the vehicle seat, the shoulder belt extends downward across the shoulder and torso of a vehicle occupant. The location of the D-ring in part determines the angle at which the shoulder belt extends from the D-ring across the occupant's torso. Depending upon the D-ring location, the shoulder belt may be uncomfortable to the occupant. Thus, it is known to mount the D-ring in a manner which permits vertical or height adjustment of the D-ring. The D-ring can then be adjusted to a position which is most comfortable for the vehicle occupant.

Typically, a D-ring is mounted on an adjustment track which is secured to the vehicle. The D-ring is movable along the adjustment track and may be locked in different positions along the adjustment track.

The shape and curvature of a vehicle structure vary with the design of each vehicle model. Each adjustment track must have a shape and curvature which closely resembles the shape and curvature of the portion of the particular vehicle on which the adjustment track is mounted. Thus, for different vehicle models, a different adjustment track may be required.

SUMMARY OF THE INVENTION

The present invention is directed to an adjustable vehicle safety belt guide assembly which can be mounted on vehicles of different designs. The assembly includes a D-ring for engaging a portion of a safety belt and for guiding the safety belt. The D-ring is mounted on a carriage. The carriage is supported on a base and is movable relative to the base.

The base includes anchors and a flexible cable. The anchors are connectable with a portion of the vehicle. The flexible cable is connected to the anchors. The flexible cable extends along a contour of the portion of the vehicle. The carriage is mounted for movement relative to the base along the cable. A lock mechanism releasably locks the carriage in one of a plurality of adjustment positions along the flexible cable. When the assembly is mounted on a vehicle portion of a particular design, the cable is flexed to conform and follow the contour of the vehicle portion. Thus, the seat belt guide assembly of the present invention is usable with a multitude of vehicle designs.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a partial sectional view of a portion of the guide mechanism shown in FIG. 1;

FIG. 3 is a view taken along line 3—3 of FIG. 2;

FIG. 6 is a sectional view taken along line 6—6 of FIG. 4.

DESCRIPTION OF PREFERRED EMBODIMENT

Figure 1:
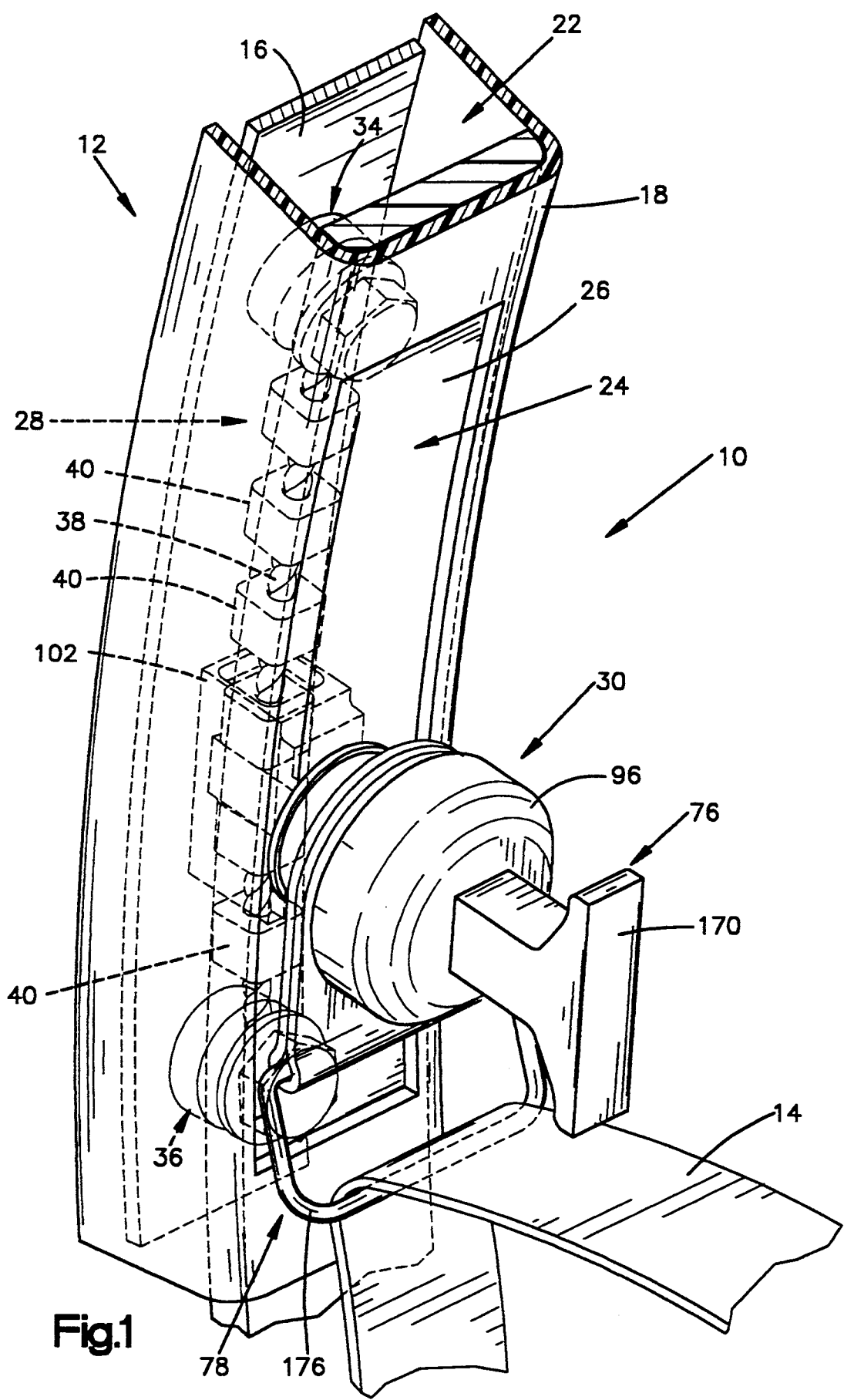
FIG. 1 illustrates an adjustable safety belt guide mechanism according to the present invention mounted on a vehicle.

An adjustable safety belt guide assembly 10 constructed in accordance with the present invention is shown in FIG. 1. The guide assembly 10 is mounted on a portion, such as a so-called B-pillar, 12 of a vehicle. The guide assembly 10 guides a safety belt 14 which extends across the torso of a vehicle occupant (not shown).

The vehicle pillar 12 includes a vehicle structural member 16. The vehicle structural member 16 is curved along its length. Typically, the vehicle structural member 16 is made of steel or other material having comparable strength. The pillar 12 includes a cover 18. The cover 18 is made of plastic or other similar material. Together, the cover 18 and the structural member 16 define a hollow channel 22 located between the structural member and the cover. The cover 18 includes a slot 24 extending along a portion of its length. A slider panel 26 is located within the hollow channel 22 and adjacent to the cover 18. The slider panel 26 is movable relative to the cover 18 and is guided by parts (not shown) of the cover 18. The slider panel 26 extends along the length of the slot 24 and conceals the hollow channel 22.

The guide assembly 10 includes a base 28 and a carriage 30. The base 28 is fixed relative to the vehicle pillar 12 and is located within the hollow channel 22. The carriage 30 is adjustable relative to the base 28. The base 28 includes upper and lower anchors 34 and 36, a flexible cable 38 and a plurality of lugs 40. The upper and lower anchors 34 and 36 (FIG. 2) are similar in design and only the upper anchor 34 (shown partially in section) is described herein. Similar reference numbers are used on the drawings to identify similar structure.

The upper anchor 34 includes a bolt 44, a nut 46 and a spacer/locator 48. The spacer/locator 48 includes a spacer portion 52 and a washer portion 54. An annular recess 56 is defined between the spacer portion 52 and the washer portion 54. A bore 50 extends through the spacer/locator 48. The bolt 44 extends through the bore 50 of the spacer/locator 48 and through the vehicle structural member 16. The spacer/locator 48 engages a side of the vehicle structural member 16. The nut 46 engages the bolt 44 on a side of the vehicle structural member 16 opposite to the spacer/locator 48. Thus, the upper anchor 34 is fixed to the vehicle structural member 16. The lower anchor 36 is similarly fixed to the vehicle structural member 16 at a location which is spaced from the upper anchor 34. In FIG. 2, the bolts 44 of the upper and lower anchors 34 and 36 are inclined toward each other because of the curvature of the vehicle structural support member 16.

The cable 38 includes upper and lower end loops 60 and 62 and an intermediate portion 64 which extends between the upper and lower end loops 60 and 62. The cable 38 is made of braided steel strands and has a diameter of $W_c$ (FIG. 3). The upper end loop 60 (shown partially in section, FIG. 2) is looped around the spacer/locator 48 of the upper anchor 34 in the annular recess 56. A first end portion (not shown) of the cable 38 is attached to the intermediate portion 64 by a fastener (not shown) at a location adjacent to the spacer/locator 48 of the upper anchor 34. Thus, the upper end loop 60 is fixed onto the spacer/locator 48 of the upper anchor 34. The lower end loop 62 (shown partially in section) is looped around the spacer/locator 48 of the lower anchor 36 in the annular recess 56. A second end portion (not shown) of the cable 38 is attached to the intermediate portion 64 by a fastener (not shown) at a location adjacent to the spacer/locator 48 of the lower anchor 36. Thus, the lower end loop 62 is fixed onto the spacer/locator 48 of the lower anchor 36. The cable 38 is flexible and, therefore, is conformable to the contour of the curved vehicle structural member 16.

FIG. 2 shows that the vehicle structural member 16 has a concave curvature. The cable 38 follows this concave curvature. As shown in FIG. 2, the cable 38 has been flexed by force, into a slightly bowed shape. The location and orientation (e.g., inclination) of the upper and lower anchors 34 and 36 maintain cable 38 in the bowed shape. Thus, the cable 38 accommodates the concave curvature of the vehicle structural member 20 and the inclination of the upper and lower anchors 34 and 36. The cable 38 could also be flexed to accommodate a surface in the vehicle structural member 16 which has a twist or upper and lower anchors 34 and 36 which are skewed relative to each other. Also, the length of the cable 38 may be modified to accommodate a different quantity of lugs 40.

In the preferred embodiment, there are six lugs 40, which are preferably made of high strength metal. Each lug 40 is fixedly attached to the cable 38 by being either crimped, swaged or formed onto the cable 38. Each lug 40 (FIG. 3) is cube shaped with rounded corners and a width $W_l$. Corresponding surfaces of adjacent lugs 40 are spaced apart at regular intervals of a distance d (FIG. 2) along the intermediate portion 64 of the cable 38. The spacing of the lugs 40 provides a gap 68 between each two adjacent lugs 40. Each gap 68 provides an adjustment location along the cable 38.

The carriage 30 (FIG. 4) includes a slider 72, a lock mechanism 74, a release mechanism 76 and a belt support 78. The slider 72 includes a slide body 84, a snap ring 86, a spacer 88, a bushing 90, a washer 92, a lock nut 94 and a cover 96.

The slide body 84 is made of metal or similar high strength material and includes a guide portion 102 and a projection portion 104. The guide portion 102 is located in the hollow channel 22 defined by the vehicle pillar 12. The guide portion 102 is elongate and extends in a direction along the cable 38. An internal surface of the guide portion 102 defines a bore 106. The bore 106 has a generally square cross-section and extends in a direction generally parallel to the direction along the cable 38. The cable 38 and the lugs 40 extend through the bore 106 of the guide portion 102. Thus, the carriage 30 is mounted on the base 28 by the guide portion 102.

The elongate projection portion 104 of the slide body 84 extends away from and is generally perpendicular to the guide portion 102. The projection portion 104 extends through an aperture 107 in the slider panel 26 and through the slot 24 on the cover 18. An internal surface of the projection portion 104 defines a bore 108. The bore 108 has a generally square cross-section and extends the length of the projection portion 104 to intersect the bore 106 of the guide portion 102.

The projection portion 104 includes a flange surface 112, an annular groove 114, an annular outer surface 115 and a threaded end 116. The flange surface 112 engages an inner side 120 of the slider panel 26. The snap ring 86 is positioned in the groove 114 and engages an outer side 122 of the slider panel 26. Thus, a portion of the slider panel 26 is entrapped between the flange surface 112 and the snap ring 86. The slider panel 26 slides along the cover 18 as the carriage 30 is adjusted.

The spacer 88 is mounted on the annular outer surface 115 of the projection portion 104 adjacent to the snap ring 86. The bushing 90 is located on the annular outer surface 115 adjacent to the spacer 88 such that the spacer 88 spaces the bushing 90 from the snap ring 86. The washer 92 is located on the annular outer surface 115 of the projection portion 104 adjacent to the bushing 90 and prevents the bushing 90 from contacting the nut 94.

The nut 94 includes a center protrusion 130, an annular threaded recess 128 that encircles the center protrusion 130, and a central bore 134 formed in the center protrusion. The center protrusion 130 is located in the bore 108 of the projection portion 104 and terminates in an abutment surface 132 located in the bore 108. The threaded end 116 of the projection portion 104 of the slide body 84 extends over the central protrusion 130 and into the threaded recess 128 of the nut 94. Thus, the nut 94 holds the washer 92, the bushing 90 and the spacer 88 on projection portion 104 of the slide body 84. The central bore 134 of the nut 94 is axially aligned with the bore 108 of the projection portion 104.

The cover 96 snaps over the nut 94. The cover 96 is made of plastic and is for aesthetic purposes. The cover 96 includes a bore 136 which is aligned with the bore 134 of the nut 94.

The lock mechanism 74 includes a latch 142 and a biasing spring 144. The latch 142 is made of metal or similar high strength material and has a generally square cross-section with a thickness $T_l$. The thickness $T_l$ of the latch 142 is slightly less than the corresponding dimension of the square bore 108 of the projection portion 104. Also, the thickness $T_l$ of the latch 142 is slightly less than the length of the gap 68 between two adjacent lugs 40 on the base 28.

The latch 142 includes a base portion 146 and a bifurcated finger portion 150. The base portion 146 has an engagement surface 148 located opposite the bifurcated finger portion 150. The bifurcated finger portion 150 defines a slot 152 (FIG. 6). The slot 152 has a width $W_s$, which is slightly greater than the diameter $W_c$ (FIG. 3) of the cable 38. Also, the width $W_s$ (FIG. 6) of the slot 152 is less than the width $W_l$ (FIG. 3) of the lugs 40.

The latch 142 (FIG. 4) is movable along the bore 108 of the projection portion 104 of the slide body 84. In a first position of the latch 142, the bifurcated finger portion 150 extends into the bore 106 of the guide portion 102 and between two adjacent lugs 40. In the first position, the bifurcated finger portion 150 envelopes a portion of the cable 38 which is located between the two adjacent lugs 40. The bifurcated finger portion 150 normally rests upon a lower one of the two adjacent lugs 40, when in this first position, but can engage or bear against either of the two adjacent lugs 40. This prevents the carriage 30 from being moved along the length of the cable 38. Thus, the carriage 30 is locked at a particular adjustment position.

Figure 5:
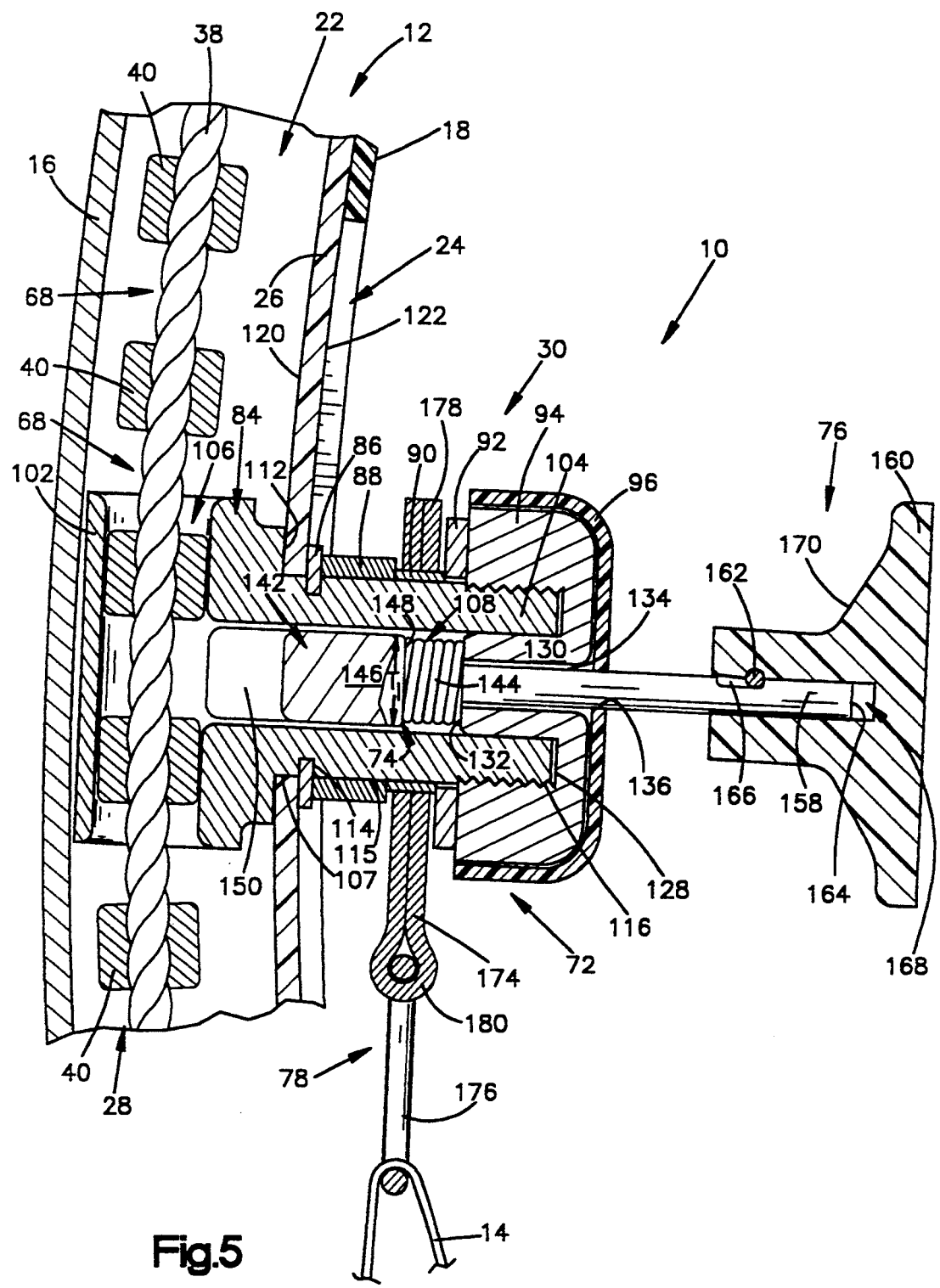
FIG. 5 is a sectional view of the guide mechanism of FIG. 1 in a second operational position.

In a second position of the latch 142 (FIG. 5), the bifurcated finger portion 150 is withdrawn from the bore 106 of the guide portion 102. With the latch 142 in the second position, the lugs 40 are free to slide through the bore 106 of the guide portion 102 as the carriage 30 is moved along the length of the cable 38. Thus, the carriage 30 is unlocked.

The biasing spring 144, which may be a coil spring, is located in the bore 108 of the projection portion 104. The biasing spring 144 extends between the abutment surface 132 of the nut 94 and the engagement surface 148 of the latch 142. The spring 144 is preloaded to bias the latch 142 into its first position.

The release mechanism 76 includes a shaft 158, a handle 160 and a pin 162. The shaft 158 is connected to the base portion 146 of the latch 142. The shaft 158 extends through the bore 108 of the projection portion 104, the bore 134 of the nut 94 and the bore 136 of the cover 96. The biasing spring 144 encircles a portion of the shaft 158 which is located in the bore 108. The shaft 158 also has a portion which extends out beyond the cover 96 and which terminates in an end 164. A slot 166 is located on the portion of the shaft 158 which extends beyond the cover 96.

The handle 160 has a surface which defines a closed-end bore 168 and also has a shaped grip 170. The shaft 158 extends into the bore 168 of the handle 160. The pin 162 extends from the handle 160 and rests in the slot 166 of the shaft 158.

The release mechanism 76 releases the lock mechanism 74 when the shaft 158 pulls the latch 142 to its second position. The shaft 158 is pulled when a vehicle occupant engages the grip 170 on the handle 160 and pulls away from the vehicle pillar 12. The movement of the grip 170 moves the pin 162 along the slot 166 a short distance. When the pin 162 engages an end of the slot 166, the shaft 158 is moved outward against the bias of the spring 144.

The belt support 78 includes a yoke 174 and a D-ring 176. The yoke 174 has a pivot portion 178 and a clasp portion 180. The pivot portion 178 extends around the bushing 90 and can be rotated around the projection portion 104 and, to a limited extent, skewed relative to the projection portion 104. The clasp portion 180 encloses a portion of the D-ring 176. The D-ring 176 supports the safety belt 14.

Figure 4:
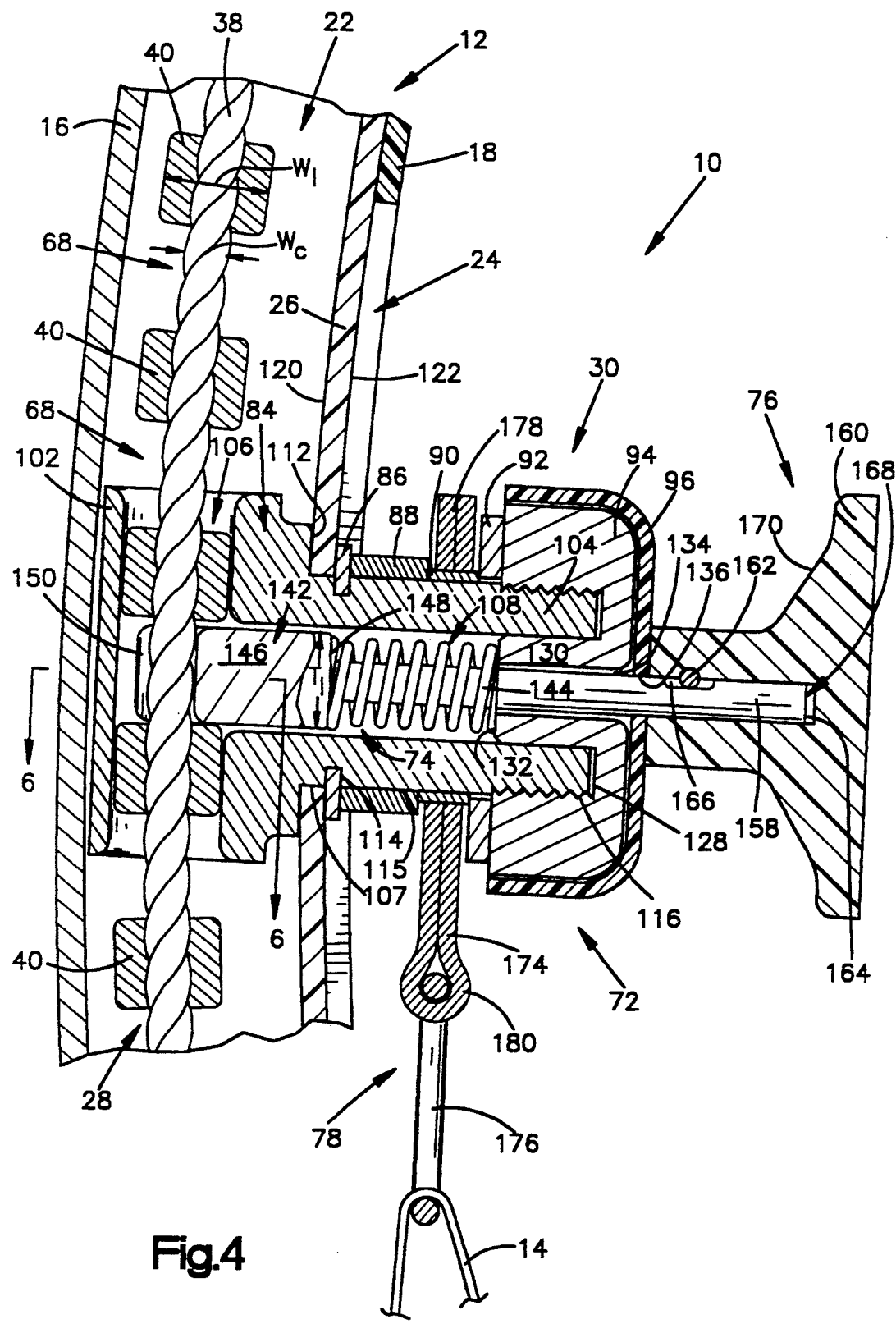
FIG. 4 is a sectional view of the guide mechanism of FIG. 1 in a first operational position.

During the use of the safety belt 14 by the vehicle occupant, the lock mechanism 74 is in its first position as shown in FIG. 4, and the carriage 30 is locked at a particular adjustment position. During a collision, the load applied by the vehicle occupant is transmitted to the safety belt 14. The safety belt 14 transmits the load to the carriage 30 via the belt support 78. The carriage 30 is prevented from moving relative to the base 28 because the latch 142 engages one of the lugs 40. Thus, the load is transferred from the carriage 30 to the base 28. Further, the load is transferred from the base 28 to the vehicle structural member 16 through the upper and lower anchors 34 and 36. Thus, the vehicle occupant is restrained.

When the vehicle occupant desires to adjust the height of the D-ring 176, the vehicle occupant grasps the grip 170 of the handle 160 and pulls the handle 160 away from the vehicle pillar 12. Pulling the handle 160 moves the shaft 158 to the right as viewed in FIG. 4. This movement of the shaft 158 moves the latch 142 against the bias of the spring 144. The latch 142 is moved along the bore 108 such that the bifurcated finger portion 150 is moved out of the bore 106 of the guide portion 102 and into the bore 108 of the projection portion 104. As the bifurcated finger portion 150 is moved out of the bore 106, the bifurcated finger portion 150 moves away from the cable 38 and the lugs 40. After the bifurcated finger portion 150 is moved away from the cable 38 and the lugs 40, the carriage 30 is unlocked. When the carriage 30 is unlocked, the carriage 30 may be adjusted vertically by sliding the guide portion 102 along the lugs 40 fixed to the cable 38.

After the desired vertical position for the carriage 30 is achieved, the vehicle occupant releases the handle 160. The bias of the biasing spring 144 moves the latch 142 and the shaft 158 inward. The bifurcated finger portion 150 of the latch 142 is moved toward the cable 38 and the lugs 40. If the bore 108 is aligned with a gap 68 between two adjacent lugs 40, the bifurcated finger portion 150 will move into the gap 68 to envelope a portion of the cable 38. Thus, the carriage 30 is locked. However, if the bore 50 is not aligned with one of the gaps 68, a slight vertical motion of the carriage 30 will align the bore 108 with one of the gaps 68 to allow the bifurcated finger portion 150 to snap into one of the gaps 68 due to the force from the biasing spring 44. When the bifurcated finger portion 150 snaps into one of the gaps 68, the carriage 30 is locked.

From the above description of the invention, those skilled in the art will perceive improvements, changes and modifications. Such improvements, changes and modifications within the skill of the art are intended to be covered by the appended claims.

Having described the invention, the following is claimed:

1. An adjustable vehicle safety belt guide assembly, said assembly comprising:
    (a) carriage means for engaging a portion of a safety belt and for guiding the safety belt;
    (b) base means for attachment to a portion of a vehicle and for supporting said carriage means;
    said base means including:
        anchor means for connection with the portion of the vehicle; and
        flexible cable means for extending along the portion of the vehicle, said flexible cable means being connected to said anchor means;
    (c) means for mounting said carriage means for movement relative to said base means along the length of said cable means; and
    (d) means for releasably locking said carriage means in one of a plurality of adjustment positions along said flexible cable means, said means for releasably locking including a plurality of stop means spaced along said cable means, each stop means having a bearing surface means for blocking movement of said carriage means.

2. An assembly as set forth in claim 1, wherein said flexible cable means is a wire cable.

3. An assembly as set forth in claim 1, wherein the portion of the vehicle has a curved contour, and said flexible cable means is curved to follow the curved contour.

4. An assembly as set forth in claim 1, wherein said anchor means includes first and second anchor members, said flexible cable means has first and second loops, and said first and second loops extend around said first and second anchor members, respectively.

5. An adjustable vehicle safety belt guide assembly, said assembly comprising:
    (a) carriage means for engaging a portion of a safety belt and for guiding the safety belt;
    (b) base means for attachment to a portion of a vehicle and for supporting said carriage means;

said base means including:
anchor means for connection with the portion of the vehicle; and
flexible cable means for extending along the portion of the vehicle, said flexible cable means being connected to said anchor means;
(c) means for mounting said carriage means for movement relative to said base means along the length of said cable means; and
(d) means for releasably locking said carriage means in one of a plurality of adjustment positions along said flexible cable means, said means for releasably locking said carriage means including a latch member mounted on said carriage means and a plurality of elements which are spaced along said flexible cable means.

6. An assembly as set forth in claim 5, wherein said plurality of elements is a plurality of lugs attached to said flexible cable means, and said latch member includes a portion for engaging a respective one of said lugs for preventing movement of said carriage means relative to said flexible cable means.

7. An adjustable vehicle safety belt guide assembly, said assembly comprising:
(a) carriage means for engaging a portion of a safety belt and for guiding the safety belt;
(b) base means for attachment to a portion of a vehicle and for supporting said carriage means;
said base means including:
anchor means for connection with the portion of the vehicle; and
flexible cable means for extending along the portion of the vehicle, said flexible cable means being connected to said anchor means;
(c) means for mounting said carriage means for movement relative to said base means along the length of said cable means; and
(d) means for releasably locking said carriage means in one of a plurality of adjustment positions along said flexible cable means, said means for mounting said carriage means for movement relative to said base means including a portion of said carriage means which defines a bore, said flexible cable means extending through said bore.

8. An adjustable vehicle safety belt guide assembly, said assembly comprising:
carriage means for engaging a portion of a safety belt and for guiding the safety belt; and
base means for attachment to a portion of a vehicle and for supporting said carriage means;
said base means including:
anchor means for connection with the portion of the vehicle,
flexible cable means for following a contour of the portion of the vehicle, said cable means being connected to said anchor means, and
a plurality of lug means for defining a plurality of adjustment positions for said carriage means, said lug means being fixed to said cable means at spaced locations along said cable means;
said carriage means being movable relative to said base means along said cable means, said carriage means including a lock means for releasably engaging one of said lug means for maintaining said carriage means at one of the adjustment positions and for per, hitting adjustment of said carriage means to another of the adjustment positions.

9. An assembly as set forth in claim 8, wherein said lock means includes latch means for bearing against one of said lug means, said latch means being movable toward and away from said plurality of lug means, said lock means including spring means for biasing said latch means into contact with said one of said lug means, and also including a release means for moving said latch means away from said plurality of lug means against the bias of said spring means.

10. An assembly as set forth in claim 8, wherein each of said lug means includes a body attached to said cable means, said body having a width which is measured transverse to the length of said cable means and which is greater than a diameter of said cable means.

11. An assembly as set forth in claim 10, wherein said lock means includes latch means for bearing against one of said bodies when said latch means is in a lock position, said latch means extending between two adjacent bodies when said latch means is in the lock position and said carriage means is in one of the adjustment positions.

12. An assembly as set forth in claim 8, wherein said anchor means includes a spacer and a bolt, said spacer having an aperture and an annular recess, said bolt extending through said aperture to engage the portion of the vehicle, said cable means having a portion wrapped around said spacer in said recess.

13. An assembly as set forth in claim 8, wherein said carriage means includes a guide means for directing said carriage means along the length of said cable means, said guide means including a surface for engaging said plurality of lug means and for sliding along said plurality of lug means.

14. An assembly as set forth in claim 8, wherein said cable means is a wire cable.

15. An assembly as set forth in claim 8, wherein said lock means includes a finger portion which is extendible between two adjacent lug means to envelope a portion of said cable means.

* * * * *

UNITED STATES PATENT AND TRADEMARK OFFICE
CERTIFICATE OF CORRECTION

PATENT NO. : 5,366,244
DATED : November 22, 1994
INVENTOR(S) : Wendell C. Lane, Jr.

It is certified that error appears in the above-indentified patent and that said Letters Patent is hereby corrected as shown below:

Column 8, Line 13, change "per,hitting" to --permitting--.

Signed and Sealed this

Thirty-first Day of January, 1995

Attest:

BRUCE LEHMAN

Attesting Officer

Commissioner of Patents and Trademarks